United States Patent
Pham

(10) Patent No.: US 10,891,351 B2
(45) Date of Patent: Jan. 12, 2021

(54) SYSTEMS AND METHODS FOR AUTOMATICALLY GENERATING AND OPTIMIZING WEB PAGES

(71) Applicant: Capital One Services, LLC, McLean, VA (US)

(72) Inventor: Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/204,054

(22) Filed: Nov. 29, 2018

(65) Prior Publication Data

US 2020/0175088 A1 Jun. 4, 2020

(51) Int. Cl.
*G06F 17/00* (2019.01)
*G06F 16/957* (2019.01)
*G06F 11/34* (2006.01)
*G06F 16/958* (2019.01)
*G06F 11/36* (2006.01)

(52) U.S. Cl.
CPC ...... *G06F 16/9577* (2019.01); *G06F 11/3466* (2013.01); *G06F 16/958* (2019.01); *G06F 16/9574* (2019.01); *G06F 11/368* (2013.01); *G06F 11/3672* (2013.01)

(58) Field of Classification Search
CPC ............. G06F 11/3466; G06F 16/9577; G06F 16/9574; G06F 16/958; G06F 11/3672; G06F 11/368
See application file for complete search history.

(56) References Cited

U.S. PATENT DOCUMENTS 8,166,155 B1 * 4/2012 Rachmeler .......... G06F 11/3438
709/224
8,234,632 B1 * 7/2012 Hugeback ........... G06F 11/3495
717/130

(Continued)

OTHER PUBLICATIONS

Google,"Google Analytics Help: Experiments," archive date May 4, 2016, downloaded from www.archive.org (WayBack Machine), 43 pages total.*

(Continued)

*Primary Examiner* — Justin S Lee
*Assistant Examiner* — James H. Blackwell
(74) *Attorney, Agent, or Firm* — Troutman Pepper Hamilton Sanders LLP; Christopher J. Forstner; John A. Morrissett

(57) ABSTRACT

A method including receiving code associated with a default web page; parsing, by a processor, the code; receiving one or more user web page preferences; retrieving historical web site performance data; generating, based on the one or more user web page preferences, the historical web site performance data, and the parsed code associated with the default web page, a plurality of web page versions; transmitting the plurality of web page versions to respective web page visitors; collecting performance data associated with each of the plurality of web page versions; analyzing, by the processor, the performance data for the plurality of web page versions; storing the performance data for at least one of the plurality of web page versions amongst the historical web site performance data; and based on the performance data, selecting one of the plurality of web page versions as the default web page.

20 Claims, 6 Drawing Sheets

(56) References Cited

U.S. PATENT DOCUMENTS

| | | | | |
|---|---|---|---|---|
| 8,839,093 B1* | 9/2014 | Siroker | ............... | G06F 16/958 |
| | | | | 715/234 |
| 9,087,035 B1* | 7/2015 | Bandaru | ............... | G06F 16/958 |
| 2008/0091517 A1 | 4/2008 | Koonce | | |
| 2008/0140591 A1* | 6/2008 | Agarwal | ............... | G06F 16/951 |
| | | | | 706/12 |
| 2008/0162699 A1* | 7/2008 | Gaffney | ............... | H04L 67/02 |
| | | | | 709/226 |
| 2008/0168249 A1* | 7/2008 | Hirzel | ............... | G06F 12/0253 |
| | | | | 711/170 |
| 2009/0063377 A1* | 3/2009 | Brady | ............... | G06Q 30/02 |
| | | | | 706/20 |
| 2009/0282343 A1* | 11/2009 | Catlin | ............... | G06Q 30/02 |
| | | | | 715/738 |
| 2012/0151329 A1 | 6/2012 | Cordasco | | |
| 2014/0026066 A1* | 1/2014 | Fishman | ............... | G06Q 30/0271 |
| | | | | 715/745 |
| 2014/0337604 A1* | 11/2014 | Strong | ............... | G06F 9/30145 |
| | | | | 712/205 |
| 2015/0095756 A1* | 4/2015 | Aganovic | ............... | G06F 17/2247 |
| | | | | 715/234 |
| 2015/0309910 A1* | 10/2015 | Cook | ............... | G06F 11/3409 |
| | | | | 709/224 |
| 2015/0317405 A1* | 11/2015 | Manchester | ............... | G06F 17/2229 |
| | | | | 715/234 |
| 2016/0103807 A1* | 4/2016 | Anderson | ............... | G06F 16/957 |
| | | | | 715/229 |
| 2016/0350796 A1* | 12/2016 | Arsenault | ............... | G06Q 30/0242 |
| 2017/0329747 A1* | 11/2017 | Noursalehi | ............... | G06F 17/212 |

OTHER PUBLICATIONS

Barenboim, R. et al.,Hierarchical Composable Optimization of Web Pages, (2012), ACM, pp. 53-62.*

Kohavi, R. et al.,"Practical Guide to Controlled Experiments on the Web: Listen to your Customers not to the HiPPO," (2007), ACM, 9 pages.*

Lai, T.L.,"Adaptive Treatment Allocation and the Multi-Armed Bandit Problem," (1987), pp. 1091-1114.*

Hill, D.N. et al.,"An Efficient Bandit Algorithm for Realtime Multivariate Optimization," (2017), ACM, pp. 1813-1821.*

Optipedia Optimization Glossary, https://www.optimizely.com/optimization-glossary/ab-testing, Copyright 2018.

* cited by examiner

SYSTEMS AND METHODS FOR AUTOMATICALLY GENERATING AND OPTIMIZING WEB PAGES

FIELD

The presently disclosed subject matter relates generally to methods and systems for generating web pages, and, more particularly, to methods and systems for automatically generating and optimizing web page layouts based on performance analytics and user preferred system metrics.

BACKGROUND

In the related art, various testing schemes including A/B, split, and multivariate testing are used on a web page to compare a baseline control web page to a plurality of test web page versions. However, such schemes require web pages to be manually generated by individuals. For example, GOOGLE® provides a web site optimizer directs different search requests to different versions of a web page. However, each version of the web page must be manually created and uploaded to a server.

Accordingly, there is a need for improved systems and methods for generating and testing a plurality of web page versions.

SUMMARY

Aspects of the disclosed technology include systems and methods for generating and selecting web page layouts. Consistent with the disclosed embodiments, the methods may include: receiving code associated with a default web page; identifying one or more components of the default web page; identifying attributes of the one or more components of the default web page; associating the one or more components with at least one pre-set component type and at least one pre-set attribute type. Further, one or more web page preferences may be received. The processor may retrieve historical web site performance data. Based on the one or more user web page preferences, the historic web site performance data, and/or the parsed code associated with the default web page, a plurality of web page versions may be generated. The generated plurality of web page versions may be transmitted to respective web page visitors. Performance data associated with each of the plurality of web page versions may be collected, and analyzed by the processor. The performance data for at least one of the plurality of web page versions may be stored amongst the historical web site performance data. Based on the performance data, one of the plurality of web page versions may be selected as the default web page.

In some embodiments, the default web page is transmitted to each of the web page visitors. According to some embodiments, the historical performance data represents performance data of a plurality of previous web page versions. The historical performance data may be updated based on the performance data. The method may further include assigning a weight to each of the plurality of web page versions. The weight may represent a percentage of web site visitors who will receive transmittal of the respective web page version. The user may provide performance criteria. The performance criteria may be used to further analyze the performance data. In some embodiments, the method may include outputting, for display, the performance data for each of the plurality of web page versions.

Another example embodiment of the present disclosure may include a method for generating and selecting web page layouts based on performance analytics including: receiving data corresponding to a web page; and parsing, by a processor, the data corresponding to a web page. Further, the processor may historical web site performance data. The method may further include generating a plurality of web page versions based on the historical web site performance data and the parsed data corresponding to the web page. The generated plurality of web page versions may be transmitted to respective web page visitors. Performance data associated with each of the plurality of web page versions may be collected and analyzed. Based on the performance data, one of the plurality of web page versions may be selected as a default version of the web page.

In some embodiments, the method may include receiving one or more user web page preferences from a user. Generating the plurality of web page versions may be based on the one or more user web page preferences. According to some embodiments, the default version of the web page is transmitted to each of the web page visitors. The historical performance data may represent performance data of a plurality of previous web page versions. The method may further include updating the historical performance data based on the performance data. In some embodiments, parsing the data corresponding to the web page may further include: identifying one or more components of the web page; identifying attributes of the one or more components of the web page; and associating the one or more components with at least one pre-set component type and at least one pre-set attribute type. According to some embodiments, the method may include assigning a weight to each of the plurality of web page versions. The weight may represent a percentage of web site visitors who receive transmittal of the respective web page version. The method may further include receiving performance criteria from a user. The performance criteria may be used to further analyze the performance data. In some embodiments, the method may include outputting, for display, the performance data for each of the plurality of web page versions. According to some embodiments, receiving data corresponding to the web page includes receiving the data corresponding to the default version of the web page.

Another example embodiment of the present disclosure may include a system for measuring user and system metrics. The system may include one or more processors and a memory in communication with the one or more processors and storing instructions that, when executed by the one or more processors, are configured to cause the system to: receive data corresponding to a default web page; identify one or more components associated with the default web page; identifying attributes of the one or more components of the default web page; and associate the one or more components with at least one pre-set component type and at least one pre-set attribute type. The system may further include receiving one or more user web page preferences, and retrieving historical web site performance data. The system may generate a plurality of web page versions based on the historic web site performance data, the one or more user web page preferences, and parsed data corresponding to the web page. The generated plurality of web page versions may be transmitted to respective web page visitors. The system may collect and analyze performance data for the plurality of web page versions. The system may store the performance data for at least one of the plurality of web page versions. Based on the performance data, the system may select one of the plurality of web page versions as the default web page.

In some embodiments, the default web page is transmitted to each of the web page visitors. According to some embodiments, the system may receive performance criteria from a user. The performance data may be further analyzed based on the performance criteria.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
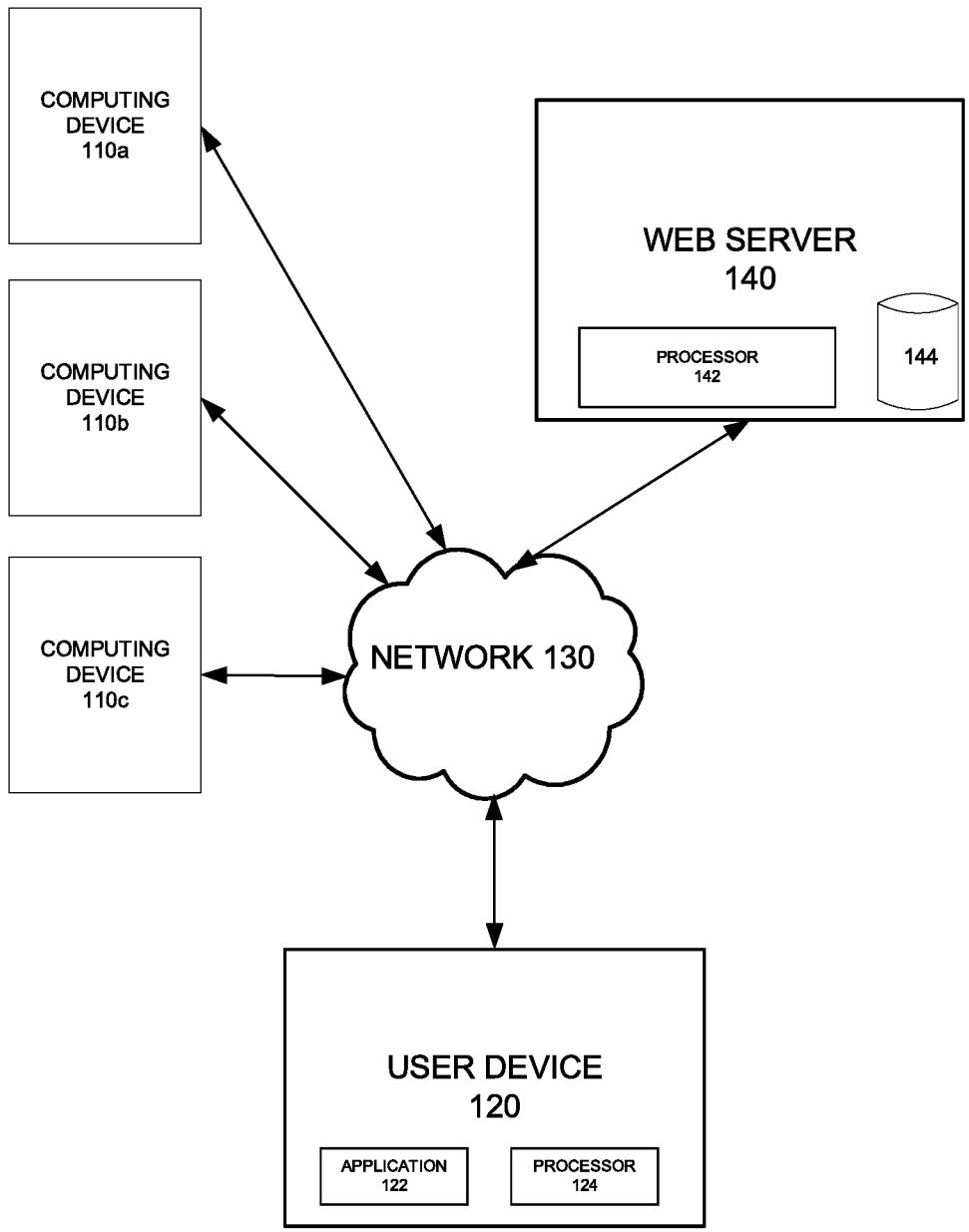
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

In an example scenario, a user may select a web page for multivariate testing. The user selection may include identifying a uniform resource locator (URL) (e.g., on a user device (e.g., laptop, smartphone)). For example, a user may provide the URL, user web page preferences, and/or performance criteria to an application associated with the user device. The user device transmits the information received at the application to a processor associated with a web server. The processor associated with the web server accesses and parses the code associated with the web page. The web page may contain components including, as non-limiting examples, banners, input boxes, images, and scripts. The processor identifies the components and associates the components with at least one pre-set component type. For example, a text box (a component) may be associated with a radial text box (a pre-set component type). The processor may also retrieve data associated with previous performance of similar versions of the web page. The processor may generate a plurality of web page versions based on the web page preferences, the previous performance of similar versions of the web page, and the parsed code of the default web page. The plurality of web page versions are then transmitted to respective web site visitors such that each web page version is transmitted only to a certain portion of web site visitors. For instance, a weight may be assigned to each web page version with the weight representing a pre-determined percentage of web site visitors who will receive that version of the web page.

The performance (e.g., as defined by various web page analytics) of each web page version is analyzed and calculated. For example, the click-through rate for each web page version may be calculated and compared against other web page versions. The results of the comparison along with the associated components may be stored in a database amongst other previous performances of versions of the web page. The processor may select a web page version as the default web page according to the web page version having performance data most consistent with user provided performance criteria. For example, the user may select an option such as the average time spent on a web page as a primary performance criteria. In that instance, the web page version having the longest average visit time per user may be selected as the default web page. The default web page may be transmitted to all (or a majority/plurality of) future web site visitors.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more visitor computing devices 110a, 110b and 110c, one or more user devices 120 which include one or more applications and/or application programming interfaces (e.g., APIs) 122 and one or more processors 124, and one or more web servers 140 including one or more processors 142 and one more databases 144. The visitor computing devices 110a, 110b, 110c, the one or more user devices 120, and the one or more web servers 140 may communicate over network 130. As non-limiting examples, the one or more computing devices 110a, 110b, and 110c may be a personal computer, a smartphone, a laptop computer, a tablet, or other personal computing device. The network 130 may include a network of interconnected computing devices more commonly referred to as the internet. The web server 140 may include one or more physical or logical devices (e.g., servers). The user device 120 may run and display one or more applications and the related output(s) of one or more applications (APIs) 122.

The user device 120 may include a processor 124 which transmits and receives data. An example computer architecture that may be used to implement one or more of the computing device 110a-110c the user device 120 and the web server 140 is described below with reference to FIG. 6.

In certain implementations according to the present disclosure, the user device 120 may include one or more APIs 122. The one or more applications 122 may receive user input data from a user. In some embodiments, the user input data may include a URL and/or an IP address of a default web page. The user input data may also include the code associated with a web page (e.g., HTML, JavaScript, CSS, CGI, ASP, PHP). The user input data may user web page preferences and/or performance criteria. The user web page preferences may include, as non-limiting examples, preferred layouts, color schemes, fonts, font sizes, input boxes, frames, web links, images, interactive media, and/or the like. The performance criteria may include click analytics (e.g., amount of clicks for a given link, comparative analysis of clicks amongst multiple links), views per page, number of visitors for a given page, average time spent per user on a given page, and/or the like. According to some embodiments, the user device 120 may display, via one or more applications 122, performance data of a plurality of web page versions. The user device 120 may receive the performance data from a processor 142 associated with web server 140. The user device 120 may include one or more processors 124. The one or more processors 124 may receive user inputted data from the one or more applications 122, and output for transmission, user inputted data, through the network 130 and to the web server 140.

Turning to the web server 140, in some embodiments, the web server 140 receives the user input from the user device 120 through the network 130. According to some embodiments, a processor 142 associated with web server 140 may receive a user input from the user device 120. The user input may include a default web page URL, code associated with a default web page, user web page preferences, performance criteria, and/or the like. In other embodiments, the web server 140 does not host the default web page. In those embodiments, the web server 140 may receive user inputs including a default web page URL, code associated with a default web page, user web page preferences, performance criteria, login credentials for the host server, and/or the like. The web server 140 may access the host server with the login credentials. The processor 142 associated with the web server 140 may parse the code associated with default web page. In some embodiments, parsing the code may include identifying one or more components of the default web page. Identifying the components of the web page may further include performing image analysis on a rendered version of the web page. For example, image analysis may include identifying various components of web page the web page by rendering the web page based on visually identifiable attributes (e.g., images or logos), and further associating the attributes with the components.

The one or more components of the default web page may include an image, an input box, a frame, a web link, and/or the like. The processor 142 may further identify attributes of the one or more components. For example, the processor 142 may identify, as an attribute, the component's color(s) or the maximum number of characters allowed in an identified input box. Additional component attributes may include interactivity (e.g., action that occurs on mouseover such as fade in/out), interaction of different components (e.g., typing in one text box may cause an image box to change pictures). In some embodiments, after identifying the one or more components and the at least one pre-set component type, the processor 142 may associate the one or more components with the at least one pre-set component type. According to some embodiments, the processor 142 may retrieve historical web site performance data from a database 144 associated with the web server 140. The historical web site performance data may include performance data associated with various modifications to previous web page versions.

In some embodiments, the processor 142 may generate a plurality of web page versions. The processor 142 may generate the plurality of web page versions based on one or more user preferences, the historical web site performance data, the parsed code associated with the default web page, and/or the like. For example, if the user wants to try out different types of logos, the processor 142 may loop through each logo. Additionally, the processor 142 may perform clustering on the logo to categorize which group the logo belongs and to optimize use of the logo based on the group. For example, if a user has a logo that includes a dog, a cat, and a skyscraper, the clustering will bind dog and cat to animals, and skyscraper to buildings. To optimize the preceding, the processor 142 may analyze, based on historical web site performance data, how logos with animals and buildings have performed. Further, image analysis may be conducted based on an image size and contrast. For instance, if a user has a plurality of dark images, the optimal background might be a light color to complement the images. In some cases, these different factors may be weighted such that generating the plurality of web page versions may vary according to weights associated with (e.g., user or automatically assigned) the user preference(s), search terms, and/or the like. For example, a user may assign the one or more web page preferences a weight of 70% and the historical web site performance data a weight of 30%. In this example, when the processor 142 generates the plurality of web page versions, the one or more web page preferences will factor in more heavily than the historical web site performance data. Accordingly, the resulting plurality of web page versions will have features more consistent with the one or more web page preferences than the historical web site performance data. The processor 142 may transmit, through network 130 and to the one or more computing devices 110a, 110b and 110c, respective versions of the plurality of web page versions to respective web page visitors (i.e., corresponding to the respective visitor computing devices 110a, 110b, and 110c). Prior to transmitting the plurality of web page versions to respective web page visitors, a weight may be assigned to each of the plurality of web page versions, wherein the weight represents a percentage of web site visitors who will receive transmittal of the respective web page version. In certain embodiments, the web server 140 loads the plurality of web page versions on a host server along with instructions to transmit the plurality of web page versions to respective web site visitors.

According to some embodiments, the processor 142 may collect performance data associated with each of the plurality of web page versions. Collecting performance data may be accomplished by accumulating data received at the web server 140 from the computing devices 110a, 110b, and/or 110c. In certain embodiments, collecting performance data may involve the web server 140 accessing the host server and retrieving performance data collected by the host server. The performance data may include click-rates, hits, impressions, unique impressions, user engagement, and/or the like. The processor 142 may analyze the performance data associated with each of the plurality of web page versions.

Analyzing the performance data may include identifying trends or patterns amongst the performance data and the corresponding web page versions, categorizing the performance data of each of the plurality of web page versions based on similarity of the data, comparing the performance data of each of the plurality of web versions against user inputted performance criteria, and/or the like. In some embodiments, the web server 140 may store the performance data for at least one of the plurality of web page versions amongst the historical web site performance data within the database 144. The processor 142 may select one of the plurality of web page versions as the default web page based on the performance data. Selection based on the performance data may involve identifying the web page version having performance data closest to a pre-identified ideal performance data amount, the web page version having performance data closest to user inputted performance criteria, and/or a combination of the two (e.g., optimized or pareto optimized). The selected default web page may be transmitted, by the processor 142, to each of the web page visitors.

In some embodiments, the one or more computing devices 110a, 110b, and/or 110c may receive a respective version of the plurality of web page versions from the web server 140 in response to requesting access to the web page. Each of the plurality of web page versions may include code (e.g., HTML, JavaScript, CSS, CGI, ASP, PHP) associated with the web page. The one or more computing devices 110a, 110b, and/or 110c may transit, via the network 130 and to the web server 140, performance data associated with a user interaction with one of the plurality of web page versions. Details of the user interaction with the respective web page version may include click-through-rate, links visited within the web site, the total amount of time spent on the web site, the amount of time spent on each page of the web site, and/or the like. In some embodiments, the one or more computing devices 110a, 110b, and/or 110c may each receive the default web page from the web server 140. According to some embodiments, user interaction with the default web page may be transmitted, via the network 130 and to the web server 140, as performance data.

Figure 2:
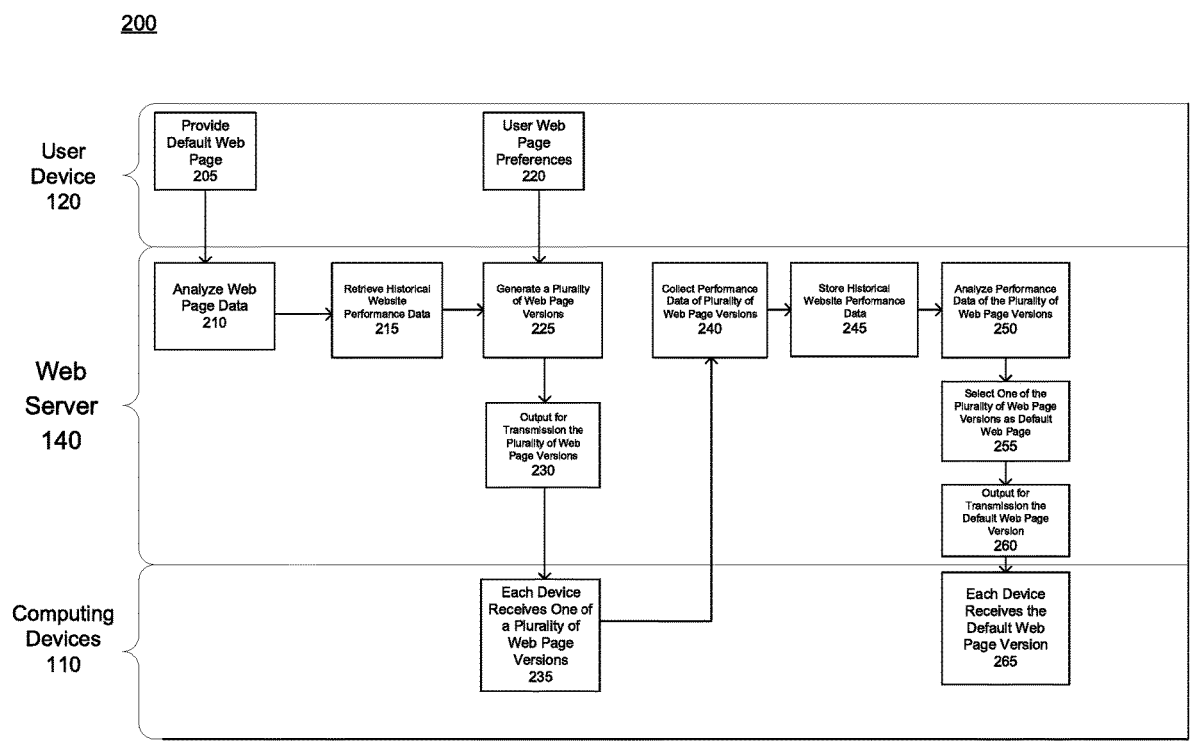
FIG. 2 is an example of a process flow diagram of a method for generating and selecting web page layouts based on performance analytics.

FIG. 2 illustrates an example process flow diagram of a method for generating and selecting web page layouts based on performance analytics. According to some embodiments, at 205, the user device 120 provides the default web page to the web server 140. The application 122 associated with the user device 120 may receive the URL and/or the default web page code. Providing the default web page may include providing the web page URL and/or the code associated with the default web page to the web server 140. The user device 120 may transmit, via the processor 124, the URL and/or the code associated with the default web page to the web server 140 through network 130. In instances where only the web page URL is provided by the user device 120 to the web server 140, the web server 140 may retrieve the code associated with the default web page. At 210, the web server 140 may analyze web page data of the default web page. Analyzing web page data of the default web page may involve parsing the code of the default web page and identifying aspects of the code. In some embodiments, identifying aspects of the code may include identifying one or more components of the code. For example, the one or more components may include images, text boxes, interactive media, frames, and/or the like. The web server 140 may further identify attributes of the one or more components. An attribute of the one or more components may include a maximum number of characters allowed for a text box component. The web server 140 may associate the identified one or more components with at least one identified attribute. For instance, a component may be recognized as a text box having an attribute of one hundred and forty maximum characters.

At 215, the web server 140 may retrieve historical web site performance data. The historical web site performance data may include web analytics associated with previous versions of the default web page. The performance data may include specific characteristics of web page versions and/or specific attributes of components of web page versions (e.g., size, color, and/or title of fonts). The performance data may include hits, impressions, clicks, click-through-rates, views, unique views, average user engagement time, and/or the like. The user may input web page preferences into the user device 120 through the application 122. At 220, the application 122 may transmit the user web page preferences to processor 124, which outputs for transmission the web page preferences to web server 140. User web page preferences may include indications of layouts, color schemes, fonts, font sizes, input boxes, frames, web links, images, interactive media, and/or the like. The web server 140 via processor 142 may generate a plurality of web page versions, at 225. Generating the plurality of web page versions may be based on the parsed code of the default web page, the one or more user web preferences, and/or the historical web site performance data. A user may input the weight of each of the aforementioned variables in generating the plurality of web page versions. In some embodiments, an algorithm may randomly decide the weight of the variables involved in generating the plurality of web page versions. In some embodiments, a pre-set weight may be assigned to each variable. According to some embodiments, the weight assigned to each variable may vary amongst the plurality of web page versions.

At 230, the web server 140 may output for transmission the plurality of web page versions to the one or more computing devices 110a, 110b, and/or 110c. In some embodiments, the processor 142 may output for transmission one of the plurality of web page versions to each of the one or more computing devices 110a, 110b, and/or 110c. Outputting the plurality of web page versions may involve transmitting respective versions of the plurality of web page versions to each of the one or more computing devices 110. Outputting the plurality of web versions may further involve transmitting code (e.g., HTML, JavaScript, CSS, CGI, ASP, PHP) associated with the respective versions of the plurality of web page versions to each of the one or more computing devices 110. A weight may be assigned to each of the plurality of web page versions, wherein the weight represents a percentage of web site visitors receiving transmittal of the respective web page version. Accordingly, the number of web site visitors receiving each of the plurality of web page versions may vary. According to some embodiments, the web server 140 may host the default web page and/or the plurality of web page versions. In other embodiments, the web server 140 may transmit the code associated with the plurality of web page versions to one or more external servers (e.g., web hosting servers) that host the plurality of web page versions. In this case, the web server 140 indirectly outputs the web page versions to one or more computing devices 110a. 110b, and/or 110c through the one or more external servers.

At 235, the computing devices 110a, 110b, and/or 110c each receive one of the plurality of web page versions. The web server 140 collects the performance data of the plurality of web page versions, at 240. When the web server 140 hosts the plurality of web page versions, collecting the performance data may involve tracking user interactions with the plurality of web page versions. User interactions may occur via engagement with at least one of the plurality of web page versions via the one or more computing device 110*a-c*. The web server 140 may track a user or users individually and/or collectively. The web server 140 may collect, as performance data, the number of visits to each of the plurality of web page versions, the time of engagement per user, and/or the like. When the web server 140 does not host the plurality of web page versions, the web server 140 may communicate with the server(s) responsible for hosting the plurality of web page versions. The host server may track the performance data associated with the plurality of web page versions received by the computing devices 110*a*, 110*b*, and/or 110*c*. The communication may involve a request by the web server 140 for performance data from the host server. In response, the web server 140 may receive performance data from the host server.

At 245, the web server 140 stores the performance data as historical web site performance data. In some embodiments, the performance data is stored at the database 144. The web server may analyze the performance data of the plurality of web versions, at 250. According to some embodiments, the processor 142 may analyze the performance data of the plurality of web page versions. Analyzing the performance data may include identifying correlations amongst the data and categorizing the performance data. Categorizing the performance data may be performed according to various performance criteria. The performance criteria may be user inputted and/or received through an algorithm. Accordingly, at least in part based on the performance criteria, the processor 142 selects one of the plurality of web page versions as the default web page, at 255. At 260, the processor 142 outputs for transmission the default web page version. Outputting the default web page version may include transmitting the code associated with the default web page to all web site visitors. Therefore, at 265, the computing devices 110*a*, 110*b*, and/or 110*c* will receive the default web page version.

Figure 3:
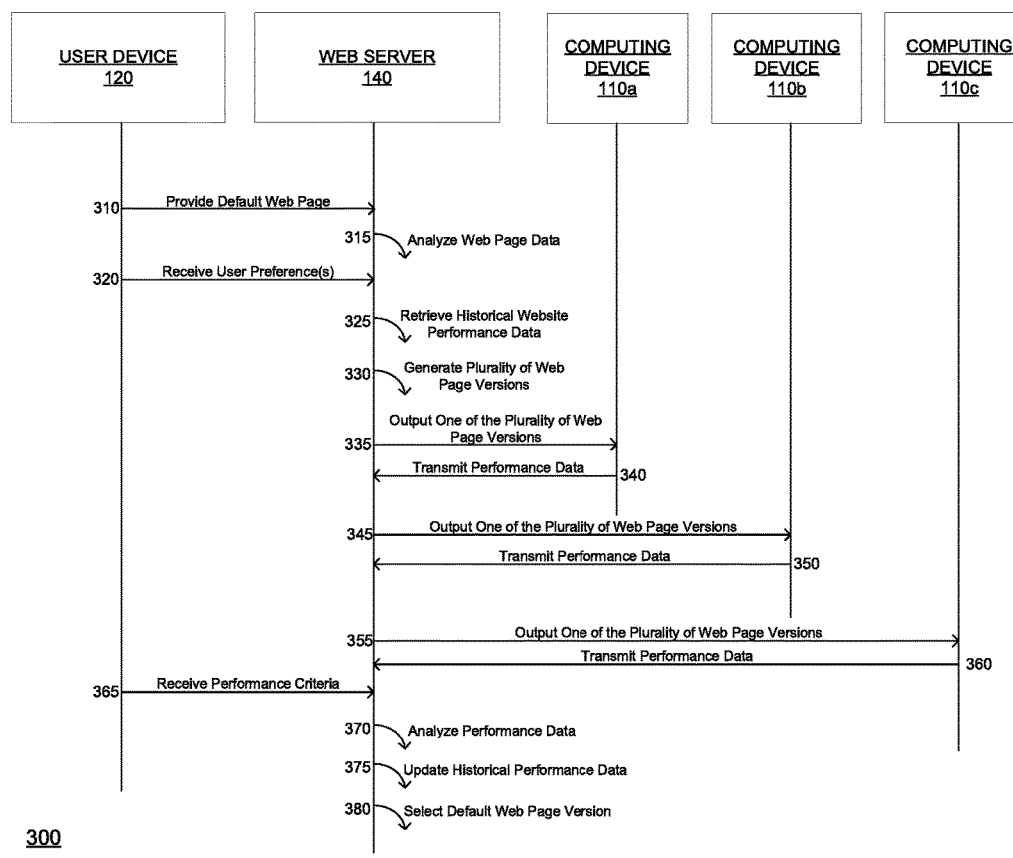
FIG. 3 is an example timing diagram for generating and selecting web page layouts based on performance analytics.

FIG. 3 is a timing diagram for generating and selecting web page layouts based on performance analytics according to an example embodiment. At 310, a user via user device 120 provides the default web page to the web server 140. Providing the default web page may involve the user device 120 outputting for transmission a URL and/or code (e.g., HTML, JavaScript, CSS, CGI, ASP, PHP) associated with the default web page to the web server 140. At 315, the processor 142 may analyze web page data associated with the default web page. Analyzing web page data may include parsing, by the processor 142, the code associated with the default web page. Parsing the code associated with the default web page may involve the processor 142 identifying one or more components and attributes of the one or more components of the default web page. Further, the processor 142 may associate the one or more components with at least one pre-set component type and at least one pre-set attribute type. For example, a radial button may be identified as a component with a default value as an attribute.

At 320, the user device 120 receives user web page preferences. In some embodiments and not shown, a user may input user web page preferences via the application 122 associated with the user device 120. User web page preferences may include preferred layouts, color schemes, fonts, font sizes, input boxes, frames, web links, images, interactive media, and/or the like. The processor 142 may retrieve historical web site performance data from the database 144, at 325. At 330, based on the parsed web page code, the user web page preferences and/or the historical web site performance data (variables), the processor 142 generates a plurality of web page versions. Generating the plurality of web page versions may be performed according to an algorithm with a pre-set weight assigned to each variable and/or by randomly generated weights assigned to each variable. Generating the plurality of web page versions may further involve a user input that assigns weights to each of the variables. At 335, the processor 142 outputs, for transmission, code associated with one of the plurality of web page versions to the one or more computing device 110*a-c*. The one or more computing device 110*a-c* transmits performance data to the web server 140, at 340. The performance data may include user engagement with the web page version. For instance, the performance data may include the web links clicked by the user, the time spent on each page of the web site, interactive media selected by the user, fields where the user entered input, and/or the like. Steps 345 and 350, and 355 and 360 may be performed substantially similar to steps 335 and 340 as described above.

The user may provide the user device 120 with performance criteria via application 122. The performance criteria may be the web analytics most desirable to the user. In some embodiments and as shown at 365, the user device 120 transmits the performance criteria to the web server 140. According to some embodiments, the user device 120 transmits the performance criteria to the processor 142. At 370, the processor 142 analyzes the performance data. Analyzing the performance data may include identifying correlations and/or categorizing the data. At 375, the performance data may be stored as historical performance data at the database 144. The processor 142 may select the default web page version from amongst the plurality of web page versions based on the performance data, at 380. Selecting based on the performance data may include receiving performance criteria from the user device 120 (not shown) and choosing one of the plurality of web page versions as the default web page based on the performance data most closely resembling the performance criteria.

Figure 4:
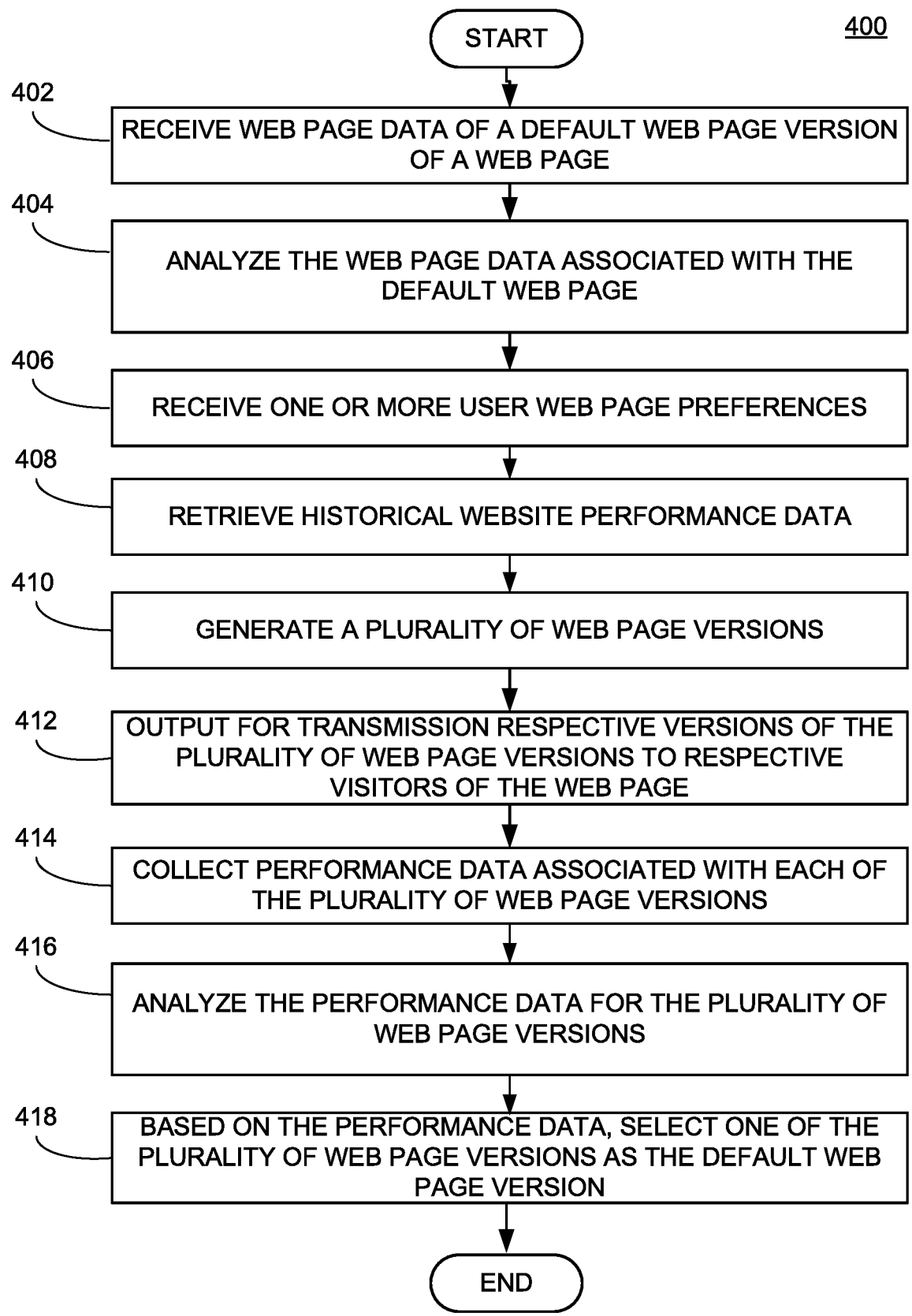
FIG. 4 is an example flow chart of a method for generating and selecting web page layouts based on performance analytics.

FIG. 4 is a flow chart of a method for generating and selecting web page layouts based on performance analytics according to an example embodiment. At 402, the web server 140 receives web page data of a default web page version of a web page. The web page data may be provided by a user from user device 120. The web page data may include a URL and/or code associated with the default web page. At 404, the web page data associated with the default web page is analyzed. The web server 140 and/or the processor 142 may analyze the data. Analyzing the data may include parsing the code associated with the default web page to identify one or more components and one or more attributes of the code. Analyzing may further include associating the one or more components with at least one pre-set component type and at least one pre-set attribute type. In some embodiments, a user may provide one or more web page preferences to the user device 120. At 406, the user device 120 may output, for transmission, the one or more user web page preferences to the web server 140. At 408, the processor 142 retrieves historical web site performance data from the database 144. The historical performance data may include performance data of one or more previous default web pages and/or a plurality of web page versions.

At 410, the processor 142 generates a plurality of web page versions. Generating the plurality of web page versions may be based on any combination of the parsed code of the default web page, the user web page preferences, and/or the historical web site performance data. After generating the plurality of web page versions, at 412, the processor 142 outputs, for transmission, respective versions of the plurality of web page versions to respective visitors of the web page. Each of the plurality of web page versions may be assigned a weight where the weight represents the percentage of web page visitors who will receive the respective web page version. At 414, the processor 142 collects performance data associated with each of the plurality of web page versions. In some embodiments, the web server 140 may host each of the plurality of web page versions. Accordingly, the performance data associated with each of the plurality of web page versions may be located on the web server 140. In other embodiments, each of the plurality of web page versions may be located on a server not associated with web server 140. In those embodiments, retrieving performance data may involve communication between the web server 140 and the server hosting the plurality of web page versions. The web server 140 may transmit a request for performance data and in response, the host server may transmit the performance data to the web server 140.

At 416, the processor 142 analyzes the performance data of each of the plurality of web page versions. The processor 142 may analyze the performance data based on identified correlations and categorized data. For example, the processor 142 may categorize the plurality of web page versions based on average user engagement time. As another example, the processor 142 may identify, as a correlation, a given layout with providing a higher click-through rate. In some embodiments, analyzing the performance data may be based on user provided performance criteria. For instance, a user may rank and submit via user device 120 several performance categories to the processor 142. In response, the processor 142 may categorize the performance data according to the user submitted performance criteria. At 418, based on the performance data, the processor 142 selects one of the plurality of web page versions as the default web page version. Selecting the default web page version may be based on, at least in part, the user submitted performance criteria. According to some embodiments, selecting the default web page version may be based on identifying the one of the plurality of web page versions having a value closest to a pre-determined amount and/or user submitted performance criteria.

Figure 5:
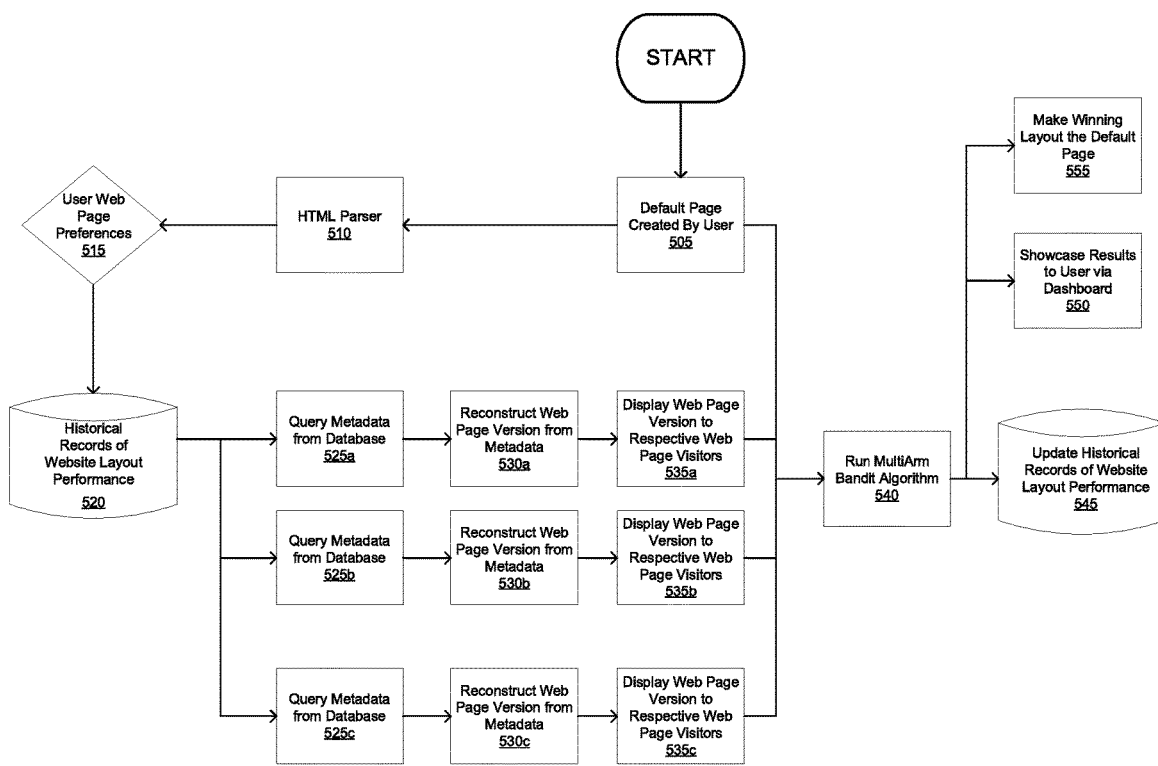
FIG. 5 is a process flow diagram of a method for generating and selecting web page layouts based on performance analytics.

FIG. 5 illustrates an example process flow diagram of a method for generating and selecting web page layouts based on performance analytics. At 505, the user creates a default web page. The user may generate the default web page using an application 122 associated with user device 120. In some cases, the user may identify the default web page which has been created previously.

At 510, the default web page may be analyzed. For example, code associated with the default web page (e.g., HTML) may be parsed (e.g., by the processor 142 associated with web server 140). Parsing the code associated with the default web page may include identifying one or more components and/or or one more attributes of the default web page. The processor 142 may associate the one or more components with at least one pre-set component type and at least one pre-set attribute type.

At 515, the user may input web page preferences into an application 122 associated with the user device 120. In some embodiments, the user may input the web page preferences into a web portal associated with the user device 120. The user device 120 may transmit the web page preferences to the web server 140. At 520, historical records of web site layout performance are retrieved from the database 144. The database 144 is queried for metadata corresponding to at least one of the previous web page versions at 525a, 525b, and/or 525c. Web page versions of the web page are reconstructed based on, at least in part, the default web page and the web site metadata at 530a, 530b, and/or 530c. At 535a, 535b, and/or 535c each respective web page version is displayed to a plurality of web site visitors. At 540, the processor 142 executes the multi-arm bandit algorithm for each of the respective web page versions (e.g., the default web page version and the reconstructed web pages).

At 545, based on the measured web analytics, the historical performance data is updated. In some embodiments, the historical records of web site layout performance may be stored at database 144. The processor 142 may output, for transmission, results associated with each of the web page versions to the user device 120. The user device 120 may display the results via a dashboard, at 550. At 555, the web page version with the preferred performance data is set as the default web page. For example, the performance data may be a category of user interaction (e.g., time on page, click-through rate, completed purchases) sought to optimize through the web page versions and the multi-arm bandit algorithm. Subsequently, the default web page (the winning web page version) may be transmitted to each web site visitor or a majority of web site visitors. According to some embodiments, selecting the default web page version may require a confirmation by the user.

Figure 6:
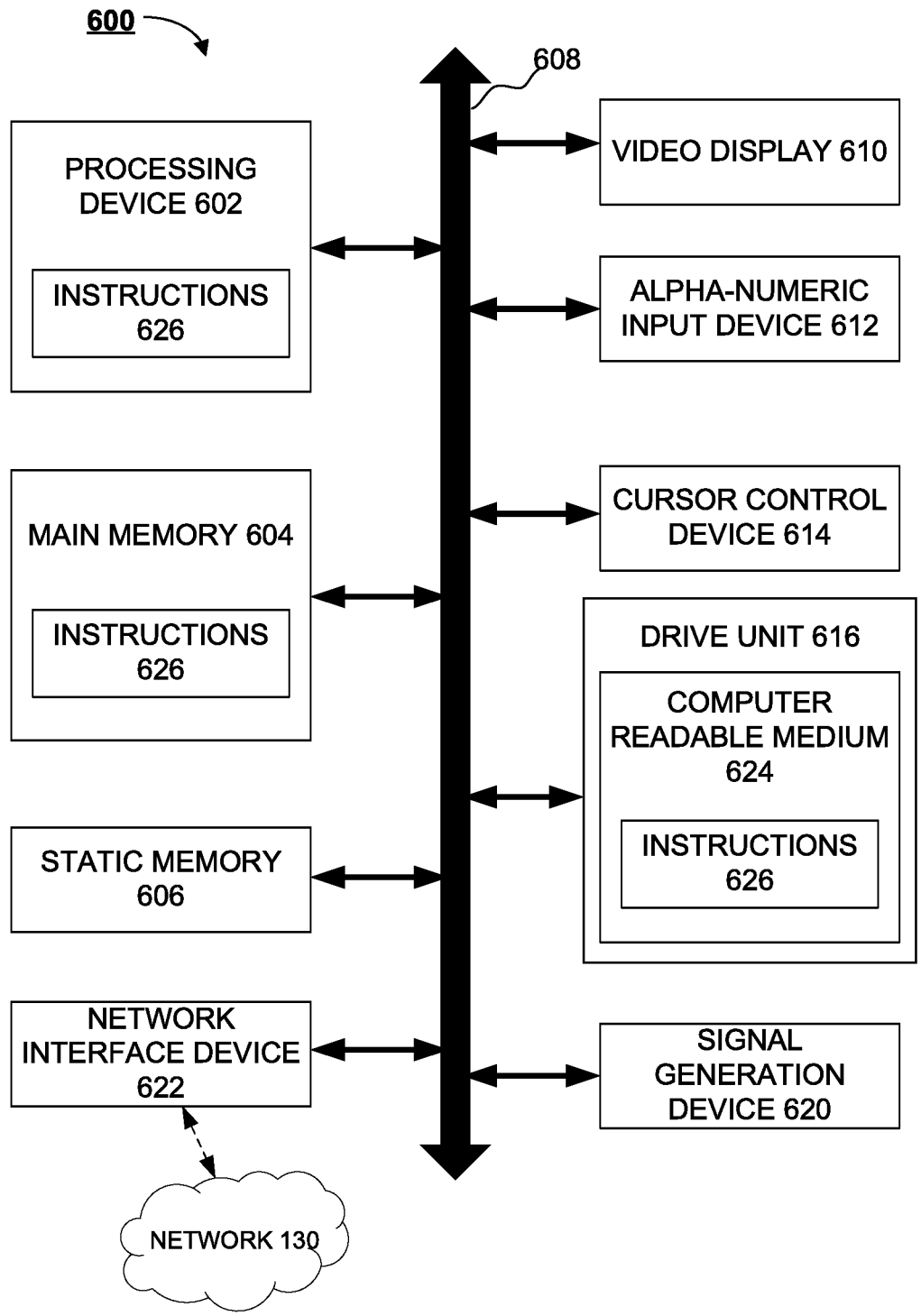
FIG. 6 is a block diagram of an example computer system that may implement certain aspects of the present disclosure.

FIG. 6 is a block diagram of an example computer system 600 that may implement certain aspects of the present disclosure. The computer system 600 may include a set of instructions 626 for controlling operation of the computer system 600. In some implementations, the computer system 600 may be connected (e.g., networked) to other machines in a Local Area Network (LAN), an intranet, an extranet, a satellite communications system, or the Internet. The computer system 600 may operate in the capacity of a server or a client machine in a client-server network environment, or as a peer machine in a peer-to-peer (or distributed) network environment. The computer system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 600 is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random-access memory (DRAM) such as synchronous DRAM (SDRAM), etc.), a static memory 606 (e.g., flash memory, static random-access memory (SRAM), etc.), and a secondary memory 616 (e.g., a data storage device), which communicate with each other via a bus 608.

The processing device 602 represents one or more general-purpose processing devices such as a microprocessor, a microcontroller, a central processing unit, or the like. As non-limiting examples, the processing device 602 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the operations for electronically creating and trading derivative products based on one or more indices relating to volatility.

The computer system 600 may further include a network interface device 622, which is connectable to a network 130. The computer system 600 also may include a video display unit 610, i.e., a display (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a non-transitory storage medium 624 on which is stored one or more sets of instructions 626 for the computer system 600 representing any one or more of the methodologies or functions described herein. For example, the instructions 626 may include instructions for implementing an asset tracking device including a power source and power management system or subsystem for a container or a trailer. The instructions 626 for the computer system 600 may also reside, completely or at least partially, within the main memory 604 and/or within the processing device 602 during execution thereof by the computer system 600, the main memory 604 and the processing device 602 also constituting computer-readable storage media.

While the storage medium 624 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of particular implementations of the present disclosure. These are intended solely for explanatory purposes and not for purposes of limitation. In one case, a web site owner seeks to improve the click-through rates for web links on his web site. The web site owner inputs the URL of his web site and login credentials associated with the server hosting his web site into an app (e.g., application 122) on his laptop (e.g., user device 120) that is connected to the internet (e.g., network 130). The host server (e.g., web server 140) receives the URL and the login credentials. Next, the host server verifies the user credentials and the associated URL. After verification, the web page code associated with the URL is parsed. By parsing the web page code, elements including the web links, images, and text boxes are identified. The layout of the elements is also determined by parsing the web page code. In response to the application prompting the web site owner for web page preferences, the web site owner selects a color scheme and a layout. The server combines the parsed web page code, the selected color scheme and layout, and previous data associated with the web page to generate several versions of the web page. Now, when respective web site visitors enter the web page URL, each visitor receives one of the several versions of the web page. Each visitor engagement with the several versions of the web page is tracked and stored. The server then analyzes each version of the web page to determine which has the best click-through rate. The web page version with the highest click-through rate is set as the default web page. Accordingly, all web page visitors entering the web page URL will receive the default web page.

In another example case, the owner of an e-commerce web site is seeking to increase her checkout rate. The owner using her smartphone (e.g., user device 120) accesses an app (e.g., application 122) for designing and testing alternate versions of a web page. On the app, she fills out a form indicating the URL of her web site, web page design preferences (e.g., layout, color scheme), and performance criteria (e.g., improved checkout rate). After entering the information, the user device transmits the inputted data to a server (e.g., web server 140). Once logged in, the server parses the web page code associated with the owner's web site. The server also accesses data associated with previous versions of the owner's web site. Combining the parsed web page code, the web page design preferences and data associated with previous versions of the owner's web site, the server generates multiple versions of the owner's web site. Now, when respective web site visitors enter the web page URL, each visitor receives one of the multiple versions of the web page. The server collects performance data associated with the multiple versions of the owner's web page. Next, the server selects the version of the web site generating the highest checkout rate as the default web page. Accordingly, all web page visitors entering the web page URL will receive the default web page.

What is claimed is:

1. A method for generating and selecting web page layouts based on performance analytics, the method comprising:
   receiving, by a first device, code associated with a default web page;
   parsing, by a processor associated with the first device, the code associated with the default web page by:
     identifying one or more components of the default web page;
     identifying attributes of the one or more components of the default web page; and
     associating the one or more components with at least one pre-set component type and at least one pre-set attribute type;
   receiving, from a user of the first device, a plurality of user web page preferences, wherein the plurality of user web page preferences comprise at least two factors selected from average user engagement time, unique views, click-through rate, and product purchase rate;
   retrieving, by the first device, historical web site performance data, wherein the historical web site performance data represents performance data for a plurality of previous web page versions viewed by a plurality of web page visitors, each of the plurality of web page visitors associated with at least one second device of a plurality of second devices;
   assigning, by the processor, an associated weight for each of the historical web site performance data, the plurality of user web page preferences, and the parsed code associated with the default web page;
   generating, by the processor, based on the plurality of user web page preferences, the historical web site performance data, the parsed code associated with the default web page, and the associated weight for each of the plurality of user web page preferences, the historical web site performance data, and the parsed code associated with the default web page, a plurality of web page versions;
   transmitting, by the user of the first device, the plurality of web page versions to the plurality of second devices associated with the plurality of web page visitors;
   collecting performance data associated with each of the plurality of web page versions;
   analyzing, by the processor, the performance data for the plurality of web page versions by executing a multi-arm bandit algorithm for each web page version of the plurality of web page versions;
   storing the performance data for at least one of the plurality of web page versions amongst the historical web site performance data; and
   based on the performance data and a rank of the plurality of user web page preferences, selecting one of the plurality of web page versions as the default web page.

2. The method of claim 1, wherein the default web page is transmitted to each of the plurality of web page visitors.

3. The method of claim 1, further comprising:
   updating the historical web site performance data based on the performance data.

4. The method of claim 1, further comprising:
   assigning a weight to each of the plurality of web page versions, wherein the weight represents a percentage of web site visitors receiving a respective web page version.

5. The method of claim 1, further comprising:
   receiving, from a user, performance criteria; and
   further analyzing the performance data based on the performance criteria.

6. The method of claim 1, further comprising:
   outputting, for display, the performance data for each of the plurality of web page versions.

7. The method of claim 1, wherein the performance data includes at least one of a click-rate, an amount of hits, an amount of impressions, or an amount of unique impressions.

8. A method for generating and selecting web page layouts based on performance analytics, the method comprising:
   receiving, by a first device, data corresponding to a web page;
   parsing, by a processor, the data corresponding to the web page;
   receiving, from a user of the first device, a plurality of user web page preferences, wherein the plurality of user web page preferences comprise at least two factors selected from average user engagement time, unique views, click-through rate, and product purchase rate;
   retrieving, by the first device, historical web site performance data, wherein the historical web site performance data represents performance data of a plurality of previous web page versions received by a plurality of web page visitors, each of the plurality of web page visitors associated with at least one second device of a plurality of second devices;
   assigning, by the processor, an associated weight for each of the historical web site performance data and the parsed data corresponding to the web page;
   generating, based on the historical web site performance data, the plurality of user web page preferences, the parsed data corresponding to the web page, and the associated weight for each of the historical web site performance data, the plurality of user web page preferences, and the parsed data corresponding to the web page, a plurality of web page versions;
   transmitting, by a user of the first device, the plurality of web page versions to the plurality of second devices associated with the plurality of web page visitors;
   collecting performance data associated with each of the plurality of web page versions;
   analyzing, by the processor, the performance data for the plurality of web page versions by executing a multi-arm bandit algorithm for each web page version of the plurality of web page versions; and
   based on the performance data and a rank of the plurality of user web page preferences, selecting one of the plurality of web page versions as a default version of the web page.

9. The method of claim 8, further comprising:
assigning, by the processor, an associated weight for the plurality of user web page preferences; and
wherein generating the plurality of web page versions is further based on the plurality of user web page preferences and the associated weight for the plurality of user web page preferences.

10. The method of claim 8, wherein the default version of the web page is transmitted to each of the web page visitors.

11. The method of claim 8, further comprising:
updating the historical web site performance data based on the performance data.

12. The method of claim 8, wherein parsing the data corresponding to the web page further comprises:
identifying one or more components of the web page;
identifying attributes of the one or more components of the web page; and
associating the one or more components with at least one pre-set component type and at least one pre-set attribute type.

13. The method of claim 8, further comprising:
assigning a weight to each of the plurality of web page versions, wherein the weight represents a percentage of web site visitors receiving transmittal of a respective web page version.

14. The method of claim 8, further comprising:
receiving, from a user, performance criteria; and
further analyzing the performance data based on the performance criteria.

15. The method of claim 8, further comprising:
outputting, for display, the performance data for each of the plurality of web page versions.

16. The method of claim 8, wherein receiving data corresponding to the web page comprises receiving the data corresponding to the default version of the web page.

17. The method of claim 8, wherein the performance data includes at least one of a click-rate, an amount of hits, an amount of impressions, or an amount of unique impressions.

18. A system for measuring user and system metrics, the system comprising:
one or more processors associated with a first device; and
a memory in communication with the one or more processors and storing instructions that, when executed by the one or more processors, are configured to cause the system to:
receive, by the first device, data corresponding to a default web page;
parsing, by the one or more processors, the default web page by:
identifying one or more components associated with the default web page;
identifying attributes of the one or more components of the default web page; and
associating the one or more components with at least one pre-set component type and at least one pre-set attribute type;
receive, from a user of the first device, a plurality of user web page preferences, wherein the plurality of user web page preferences comprise at least two factors selected from average user engagement time, unique views, click-through rate, and product purchase rate;
retrieve, by the first device, historical web site performance data, wherein the historical web site performance data represents performance data of a plurality of previous web page versions received by a plurality of web page visitors, wherein each of the plurality of web page visitors is associated with at least one second device of a plurality of second devices, and wherein the performance data includes at least one of a click-rate, an amount of hits, an amount of impressions, or an amount of unique impressions;
assign an associated weight for each of the historical web site performance data, the plurality of user web page preferences, and parsed code associated with the default web page;
generate, based on the historic web site performance data, the plurality of user web page preferences, parsed data corresponding to the default web page, and the associated weight for each of the plurality of user web page preferences, the historical web site performance data, and the parsed code associated with the default web page, a plurality of web page versions;
transmit, by the user of the first device, the plurality of web page versions to the plurality of second devices associated with the plurality of web page visitors;
collect performance data associated with each of the plurality of web page versions;
analyze the performance data for the plurality of web page versions by executing a multi-arm bandit algorithm for each web page version of the plurality of web page versions;
store the performance data for at least one of the plurality of web page versions; and
based on the performance data and a rank of the plurality of user web page preference, select one of the plurality of web page versions as the default web page.

19. The system of claim 18, wherein the default web page is transmitted to each of the plurality of web page visitors.

20. The system of claim 18 further comprising:
receiving, from a user, performance criteria; and
further analyzing the performance data based on the performance criteria.

* * * * *